United States Patent
Bachmann et al.

(10) Patent No.: US 7,370,548 B2
(45) Date of Patent: May 13, 2008

(54) METHOD FOR CONTROLLING AND REGULATING A TRANSMISSION BRAKE IN AN AUTOMATIC MOTOR VEHICLE TRANSMISSION

(75) Inventors: Volker Bachmann, Eriskirch (DE); Mario Steinborn, Friedrichshafen (DE); Rudolf Kalthoff, Weingarten (DE); Anthony Robert Sayman, Laurinburg, NC (US)

(73) Assignee: ZF Friedrichshafen AG, Friedrichshafen (DE)

( * ) Notice: Subject to any disclaimer, the term of this patent is extended or adjusted under 35 U.S.C. 154(b) by 178 days.

(21) Appl. No.: 10/563,417

(22) PCT Filed: Jun. 8, 2004

(86) PCT No.: PCT/EP2004/006145

§ 371 (c)(1),
(2), (4) Date: Jan. 27, 2006

(87) PCT Pub. No.: WO2005/003601

PCT Pub. Date: Jan. 13, 2005

(65) Prior Publication Data

US 2006/0179963 A1    Aug. 17, 2006

(30) Foreign Application Priority Data

Jul. 5, 2003    (DE) ................... 103 30 517

(51) Int. Cl.
*F16H 3/38* (2006.01)

(52) U.S. Cl. ...................................... 74/339

(58) Field of Classification Search ............. None
See application file for complete search history.

(56) References Cited

U.S. PATENT DOCUMENTS

| | | | |
|---|---|---|---|
| 3,834,499 A | 9/1974 | Candellero et al. | |
| 4,727,764 A | 3/1988 | Klaue | |
| 5,425,689 A | 6/1995 | Genise | |
| 5,620,392 A * | 4/1997 | Genise | 477/120 |
| 5,822,708 A | 10/1998 | Wagner et al. | |
| 5,910,069 A * | 6/1999 | Markyvech | 477/109 |
| 5,984,831 A | 11/1999 | Wadas et al. | |
| 6,503,171 B1 | 1/2003 | Böckmann et al. | |

(Continued)

FOREIGN PATENT DOCUMENTS

DE    195 44 516 A1    6/1997

(Continued)

*Primary Examiner*—Dirk Wright
(74) *Attorney, Agent, or Firm*—Davis Bujold & Daniels, P.L.L.C.

(57) ABSTRACT

A method for the control and regulation of a transmission brake in an automatic transmission with a countershaft. The transmission brake arrests a transmission input shaft or a countershaft during an upshifting procedure. The speed of rotation (1) of these shafts at the engagement point in time corresponds to the synchronous speed of rotation already established by the transmission output speed of rotation and the ratio of the selected gear stage or approaches this value up to a predetermined tolerance of deviation. The disengagement point in time for the transmission brake is calculated with the aid of the brake rate of change of the countershaft, i.e., the transmission input speed of rotation as well as with the rate of change of the transmission output shaft speed of rotation. The transmission brake is further provided with disengagement, given consideration of lead time, before the calculated disengagement point in time.

7 Claims, 2 Drawing Sheets

U.S. PATENT DOCUMENTS 6,785,598 B2    8/2004   Schiele
6,885,928 B2 *  4/2005   Berglund et al. .............. 701/51

FOREIGN PATENT DOCUMENTS

| | | |
|---|---|---|
| DE | 196 52 916 A1 | 6/1998 |
| DE | 100 23 053 A1 | 12/2001 |
| DE | 103 05 254 A1 | 8/2004 |
| EP | 0 947 741 A2 | 10/1999 |
| EP | 1 092 582 A2 | 4/2001 |
| WO | WO-85/05427 | 12/1985 |

* cited by examiner

METHOD FOR CONTROLLING AND REGULATING A TRANSMISSION BRAKE IN AN AUTOMATIC MOTOR VEHICLE TRANSMISSION

This application is a national stage completion of PCT/EP2004/006145 filed Jun. 8, 2004 which claims priority from German Application Serial No. 103 30 517.3 filed Jul. 5, 2003.

FIELD OF THE INVENTION

The invention concerns a method for the controlling and regulation of a transmission brake in a motor vehicle transmission.

BACKGROUND OF THE INVENTION

In practice, manual and automatic shifting transmissions are known, which possess an input shaft, an output shaft coaxial to the input shaft and a countershaft for their operation. In accordance with the number of gear stages, gear pairings are to be found on the transmission shafts where, respectively, a fixed gear attached on a transmission shaft meshes with at least one loose gear placed on another transmission shaft.

As a rule, where a gear stage procedure is concerned, one of the loose gears is bound to its transmission shaft by way of a shape-fit clutch arrangement, which enables it to assume the entire driving torque. In order to transfer large driving torques with simple, space saving means, shape-fit clutches are advantageously used, which are easily shifted. However, during the engaging procedure, i.e., the shifting operation, the pulling power of the drive motor is interrupted due to a separated shifting clutch and a start clutch.

In order to shift such transmissions in ways that can be described as simple, free of impacts, quick and quiet, it is necessary that the components to be shifted be brought to nearly the same speed of rotation before they engage with one another. For this purpose, synchronization apparatuses are provided which, during the traction interruption phase, delay or accelerate the drive side of the input power string between the shifting/starting clutch and the respective coupling apparatus down to or up to a certain speed of rotation. This certain speed of rotation is determined by the current traveling speed and the transmission ratio at the desired gear stage. If a driver upshifts from a lower gear into a higher gear then, because of this the synchronization apparatus, the drive side part of the transmission is slowed. Conversely, if the driver downshifts, an acceleration thereof ensues.

For these accelerations and braking operations, the conventional synchronization apparatuses employ friction clutches based on friction cones. These are not required to transfer the entire drive-torque load, but are designed to carry out only the synchronization function, which arises from the momentum of the rotating masses of the drive-side part of the transmission as well as from the friction related drag-torque. On this account, synchronization apparatuses can be made in small dimensions.

Normally, to each of these shape-fit coupling devices, one synchronization apparatus is assigned. It is also possible that a central synchronizing-center can take over the necessary synchronizing function for several or for all of the shape fit coupling devices.

In order to relieve the driver of a vehicle from mechanical shifting and clutch operations involved with the above shifting methods, in the case of automatized shifting transmissions, these shifting methods and coupling procedures are assumed by auxiliary servo-apparatuses, which are under the direction of a control and regulation system. To fulfill its above stated purpose, the mentioned control and regulation system determines the shifting procedure reflecting the driver's desire from sensor acquired vehicle data and, accordingly, controls (or regulates) thereupon the succession of shifts to be carried out in the transmission with the aid of stored control and regulation programming.

In the case of such automatic transmissions, the synchronization procedure is, for example, so capable of being controlled and regulated that by downshifting procedures the speed of rotation of the input drive shaft of the transmission or the speed of rotation of the corresponding countershaft is made greater by increasing the rotary speed of the motor. Conversely, during upshifting procedures, these drive-side shafts of the transmission are subjected to braking. For the execution of such braking procedures, centrally synchronized transmissions normally rely on a "transmission brake", which is mechanically coupled to the countershaft. These transmission brakes are activated by electrical, hydraulic or pneumatic power media. Pneumatically activated transmission brakes are commonly found in commercial vehicles.

DE 196 52 916 A1 discloses an automatized shifting transmission with a hydraulically or pneumatically activated transmission brake, wherein the pneumatically activated brake can be applied to a countershaft. The control valves for the hydraulic pressure fluid to serve the brake are regulated by a microprocessor which is programmed for the desired method of shifting as well as for the other driving operations.

For example, where an upshifting is concerned, if a higher gear stage has been preselected and the countershaft, on this account, must be subjected to braking for synchronization purposes, then a set speed of rotation (synchronized speed of rotation) for the countershaft is computed by the microprocessor which utilizes the preselected gear ratio and the corresponding output speed of rotation of the transmission, which is picked up by a sensor. Upon achieving the above values, then the mechanical coupling of the targeted loose gear to this shaft can be carried out.

Because of the difficult regulation of air pressure which, as a rule, is the case when pneumatic servomechanisms are concerned, plus additional problems from changeable ambient conditions, the transmission brake capacity and particularly the rate of change of such pneumatic transmission brakes are subject to large variances. In order to attain the required window of speed of rotation, i.e., to attain the preset maximum difference between the actual speed of rotation of the transmission input drive shaft—that is, of the rotational speed of the countershaft driven by the input drive shaft—to the set speed of rotation for the desired shifting procedure, in accordance with the prior state of the technology. Additionally, even the rate of change of the transmission brake must be determined and be input to the microprocessor upon control of the transmission brake. To this end, the control valves are so regulated by the microprocessor that they achieve the set values and therewith the synchronized speed of rotation is determined for an engagement of the coupling apparatus to the selected loose gear.

Unfortunately, a synchronized speed of rotation is not a fixed value for one shifting procedure but, among other considerations, is dependent upon the inclination of the traveled road. The reason for this is that during a shifting procedure with an open starting and shifting clutch, as well as climbing on a rising road, a negative vehicle acceleration occurs which leads to a drop of the transmission output rotational speed or, on the other hand, upon a downward sloped stretch of road and with untouched wheel brakes, a positive vehicle acceleration can come about. These stated influences were not previously taken into consideration in the case of the control and regulation procedures for transmission braking according to the state of the technology. Consequently, the desired operational results were never fully consummated.

On this account, a proposal was made by the (not published) text of DE 103 05 254 A1 that, in addition, to the previously stated values for the control and regulation of the transmission brake, the rate of change of the speed of rotation of transmission output shaft should also be evaluated. By this method of procedure, the speed of rotation of the transmission output shaft with the ratio of the desired gear stage is related to the speed of rotation of the countershaft and, further, the ambient environment and/or the influence of the characteristics of the traveled road are being given more consideration than before. Especially during the shifting procedure, occurring rapid changes of the transmission output shaft speed of rotation can also be brought into the control and regulation of the transmission braking.

Moreover, the said DE 103 05 254 A1 also teaches that, first, from the rate of change of the transmission input speed of rotation, which is also that of the countershaft, and second, from the rate of change due to the influences, as mentioned above, on the changing transmission output shaft speed of rotation, a so-called composite rate of change may be computed, which contributes to the calculation of the disengagement point in regard to the activation time required for the transmission brake upon the attainment of the synchronization point. This disengagement point of time is, by comparison, even under varying transmission brake friction values and under output speed of rotation variance rates of change, capable of being way for the exact determination of a safe, rapid and jerk free shifting procedure.

Even though, by means of the above described procedure, the operational behavior of transmission braking is already clearly improved, there also exists additional optimizing possibilities.

Given this background, it is the purpose of the invention, to continue the improvement of the operational behavior of a transmission brake and therewith also to better the shifting method of an automatic transmission, especially with an upshifting procedure so that an optimal disengagement point can be better determined than formerly.

SUMMARY OF THE INVENTION

The invention relies on a recognition that the transmission brake must be disengaged prior to the calculated disengagement point to achieve a preliminary compensation for a subsequent brake run down period. That is, a certain lead time in a disengagement state must be waited out in order to execute an optimal upshift procedure. This preliminary lead time is, however, not identical for each transmission brake. Much more, the lead time in actual practice is subjected to a wide range of individual brake diversions. For the improvement of the activation behavior of a transmission brake, it is necessary that the characteristics of the transmission brake be determined in accordance with their individual rundown times and these determinations are taken into consideration in the operation of the transmission brake.

According to the invention, a procedure is proposed for the control and regulation of a transmission brake of a countershaft type designed automatic transmission wherein this transmission is furnished with a transmission input shaft with at least one countershaft driven by the input shaft. The transmission is further equipped with a transmission output shaft. In addition, on the transmission input shaft, on the countershaft and/or on the transmission output shaft, loose gears are rotatably supported and/or fixed gears are placed in rotatably fixed attachments, which gears at least stay in an enmeshed grip with one another to form gear-pairs, whereby the free gears are bound to their transmission shaft in a fixed rotational manner by way of coupling apparatuses in order to carry out gear changes.

To continue, this transmission includes a transmission brake with which the countershaft is braked in such a manner under the regulation of a controller during an upshift procedure that the speed of rotation thereof at the engagement point corresponds to or approaches the synchronized speed of rotation within a preplanned tolerance. With that established, for the determination of a shutoff point of the transmission brake, consideration must be given to the braking rate of change of the countershaft rotational speed or of the rotational speed of the transmission input shaft as well as to the rate of change of the rotational speed of the transmission output shaft. For a more complete improvement of upshift procedures in the case of a so-described transmission, provision is now made so that the transmission brake can be disengaged with consideration given to lead time prior to the time of the calculated disengagement.

Since each transmission brake possesses operational behavior within the borders of individuality, in one development of the invention, the lead time is at least individually determined for a transmission brake installed in an automatic transmission, even though a repeated, adaptive determination of this lead time is favored for each upshift procedure. For this purpose, this lead time is advantageously evaluated for the sake of the quality of a completed upshift procedure, especially in regard to a synchronous rotation of such components as take part in the shifting procedure.

Preferably, the reaching of a predetermined, narrowly bordered, targeted speed of rotation window can be made to serve as a criterion for the quality of a finished upshift procedure, which should be arrived at from the transmission input speed of rotation due to brake engagement. The upper speed of rotation limit of this targeted speed of rotation window, advantageously lies under the set input rotational speed of the transmission which can be measured after the upshifting.

For the determination of an optimal shutoff point of time of the transmission brake, the value of the lead time should be advantageously determined anew as being adaptive in the case of each upshift procedure. For this purpose, the value of the transmission input speed of rotation should be compared with the upper and lower limits of the window of the targeted speed of rotation If the engagement coupling procedure is carried out as is the desired object with a transmission input speed of rotation lying within the window of a targeted speed of rotation, then the lead time, at least for the next upshift procedure, remains constant.

The lead time would be newly calculated if the engagement coupling procedure takes place at a transmission entry speed of rotation which lies outside of the targeted speed of rotation window. By means of this situation, what is achieved is that a better shutoff point for the transmission brake is established. Thereby, finally the shifting quality of the upshift procedure is once again improved over the known method for the next following upshift procedure.

For the purpose of a new computation of lead time for the disengagement of the transmission brake, two differing procedure methods were proposed within the scope of the invention. In the first procedure method, when the engagement procedure is done on a basis of speed of rotation, below the targeted speed of rotation window limits, then the lead time for the immediately following upshift procedure is delayed for a preselected time interval. However, the lead time is shortened by a preselected time interval if the engagement procedure is based on a speed of rotation above the targeted speed of rotation window limits.

These predetermined time intervals are, advantageously, comparably small interruptions so that, in the course of several upshifting procedures, the one optimal upshift, quality assuring, targeted speed of rotation window is surely attainable.

In the case of the second procedure method, for the computation of a new lead time, first, the maximum speed of rotation rate of change of the transmission input shaft is determined, while the upshifting procedure is in operation. As soon as the speed of rotation difference between the transmission input speed of rotation during the engagement coupling procedure and the mid-value of the desired speed of rotation window is determined and subsequently, by way of a division of the speed of rotation difference by the maximum speed of rotation rate of change, the altering value for the next upshifting procedure is determined. The mathematical application (i.e., addition or subtraction) of this altering value to (or from) the previous lead time then produces the new lead time for the following upshift procedure.

With the aid of this second procedure, once again, it is possible to carry out a clearly improved upshift process for the next upshift procedure by the use of the new lead time.

BRIEF DESCRIPTION OF THE DRAWINGS

The invention will now be described, by way of example, with reference to the accompanying drawings in which.

DETAILED DESCRIPTION OF THE INVENTION

Figure 1:
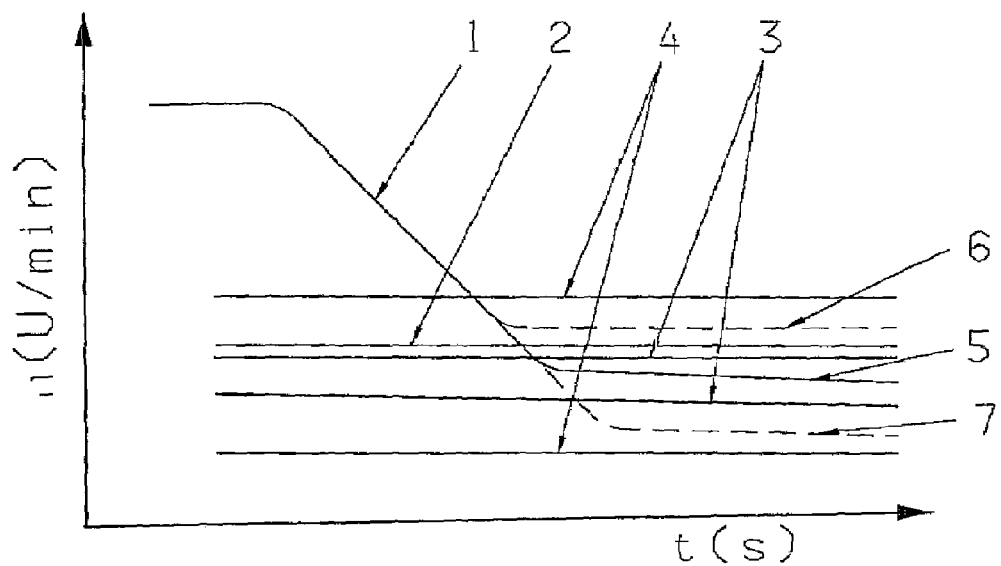
FIG. 1 is a diagram with time based curves of transmission speeds of rotation relevant to the upshifting procedure.
Figure 2:
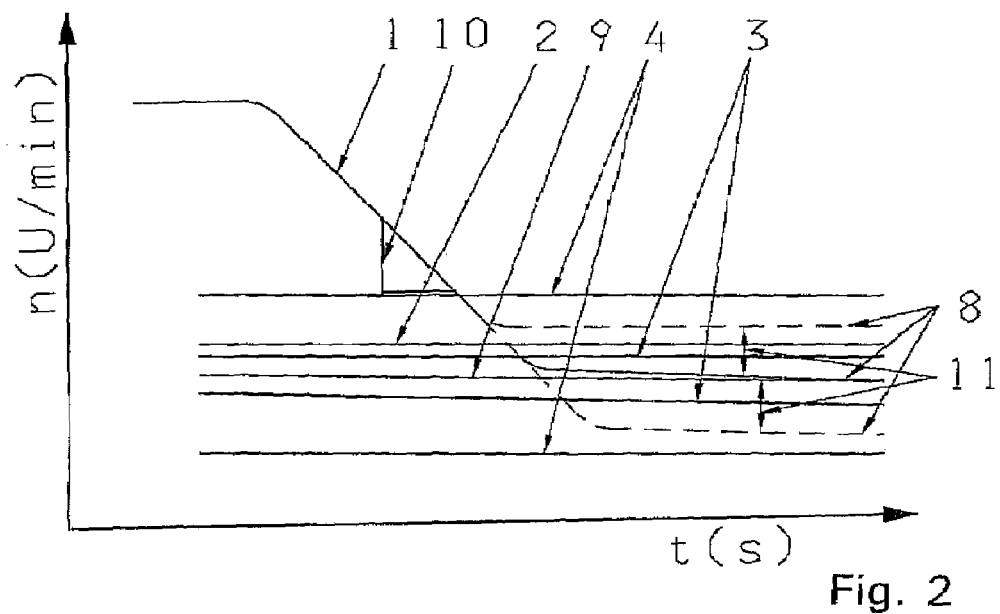
FIG. 2 is a diagram, similar to FIG. 1, however, with explanatory comments for the determination of the rate of change of the transmission speed of rotation.

In the diagram presented in FIG. 1 is to be seen a curve of the transmission input speed of rotation 1, plotted against time during an upshift procedure. As is customary, during such upshift procedures, the transmission input speed of rotation is braked down from a comparative high speed of rotation level by way of the braking action of a transmission brake 12 to the extent, that this corresponds to a set transmission input speed of rotation 2 or approaches very close to this value. This set transmission input speed of rotation 2 finds itself in a synchronized run, speed of rotation window 4, upon the attainment of which, fundamentally, a mechanical coupling of the transmission member for the next high transmission gear stage is possible.

For the carrying out of very comfortable upshift procedures, however, it is of advantage, if the transmission input speed of rotation 1 is braked to the extent that it then lies in a targeted speed of rotation window 3 which, of itself, is defined as at the midpoint of the synchronous run speed of rotation window 4. Additionally, it is advantageous, if the upper limit of the targeted speed of rotation window 3 lies underneath the specified transmission input speed of rotation 2. For the determination of the disengagement point of time of the transmission brake, as has already been explained, the rate of change of rotation speed of the countershaft, i.e., the transmission input speed of rotation, as well as the rate of change of the rotation of the transmission output shaft must be considered.

As can be seen in FIG. 1, it is possible that the transmission input speed of rotation 1 is so braked by the transmission brake that this, with its speed of rotation curve 5, lies in the targeted speed of rotation window 3, above the targeted speed of rotation (speed of rotation curve 6) or under the targeted speed of rotation window (speed of rotation curve 7). Since the best high gear shift quality is then achieved, if by means of a well suited disengagement point of time for the transmission brake, the transmission input speed of rotation falls within the targeted speed of rotation window 3, then the transmission brake, in accordance with the invention, under consideration of lead time, is disengaged before the calculated disengagement point of time. This lead time is advantageously newly calculated at, or after each upshift procedure, so that a new lead time can be put to use for the next upshift procedure.

Such a renewed calculation of the lead time can be eliminated, if the transmission input speed of rotation at an exactly executed upshift procedure lies within the targeted speed of rotation window.

Insofar as the engagement of the transmission components for the next gear stage is carried out below the targeted speed of rotation window 3 (transmission input speed of rotation curve 7), it is possible that in a first invented method of procedure, the lead time for the next upshifting procedure is increased by a predetermined interval of time so that, as a result, the transmission brake no longer acts as long as in the case of the braking for the former upshifting procedure and, on this account, a high value for the transmission input speed of rotation 1 is achieved.

Contrarily, if the engagement procedure has been carried out at a transmission input speed of rotation 6, which lies above the specified speed of rotation window 3, then the lead time is shortened by a predetermined interval of time. By means of this measure, the disengagement point of time to which the lead time contributed comes closer to the previously calculated disengagement time so that the transmission brake carries out its braking action for a longer time period than was the case in the previous upshift procedure. As a result thereof, on this account, a lesser value for the transmission input speed of rotation 1 is achieved.

In the case of the two above mentioned adjustment procedures, advantageously, small time periods were chosen within which the lead time would be cut short or extended. Thereby, it becomes possible, even after few upshift procedures, to have the targeted speed of rotation window 3 occur.

In accordance with another invented method of procedure, upon the attainment of the targeted speed of rotation window 3, first, a determination is made of a maximum rate of change 10 of the transmission input speed of rotation 1 during the ongoing upshifting procedure, and then, subsequently, a speed of rotation difference 11 between a transmission input speed of rotation 8 during the engagement coupling procedure and a midpoint 9 of the targeted speed of rotation window 3 is determined. Finally, to continue, by means of division of the speed of rotation difference 11 by the maximum speed of rotation rate of change 10, the altering value for the next upshifting procedure can be calculated. By means of a subsequent addition/subtraction of this altering value to/from the lead time of the most recent upshifting procedure, then a new lead time for the next upshifting procedure can be calculated and held in readiness for this action.

In regard to this second method of procedure in accordance therewith, it is possible for the next upshifting procedure to immediately calculate to obtain a clearly improved lead time whereby, in comparison to the first named method of procedure, an unimportant, but greater calculation time becomes necessary in a control apparatus of this kind.

Figure 3:
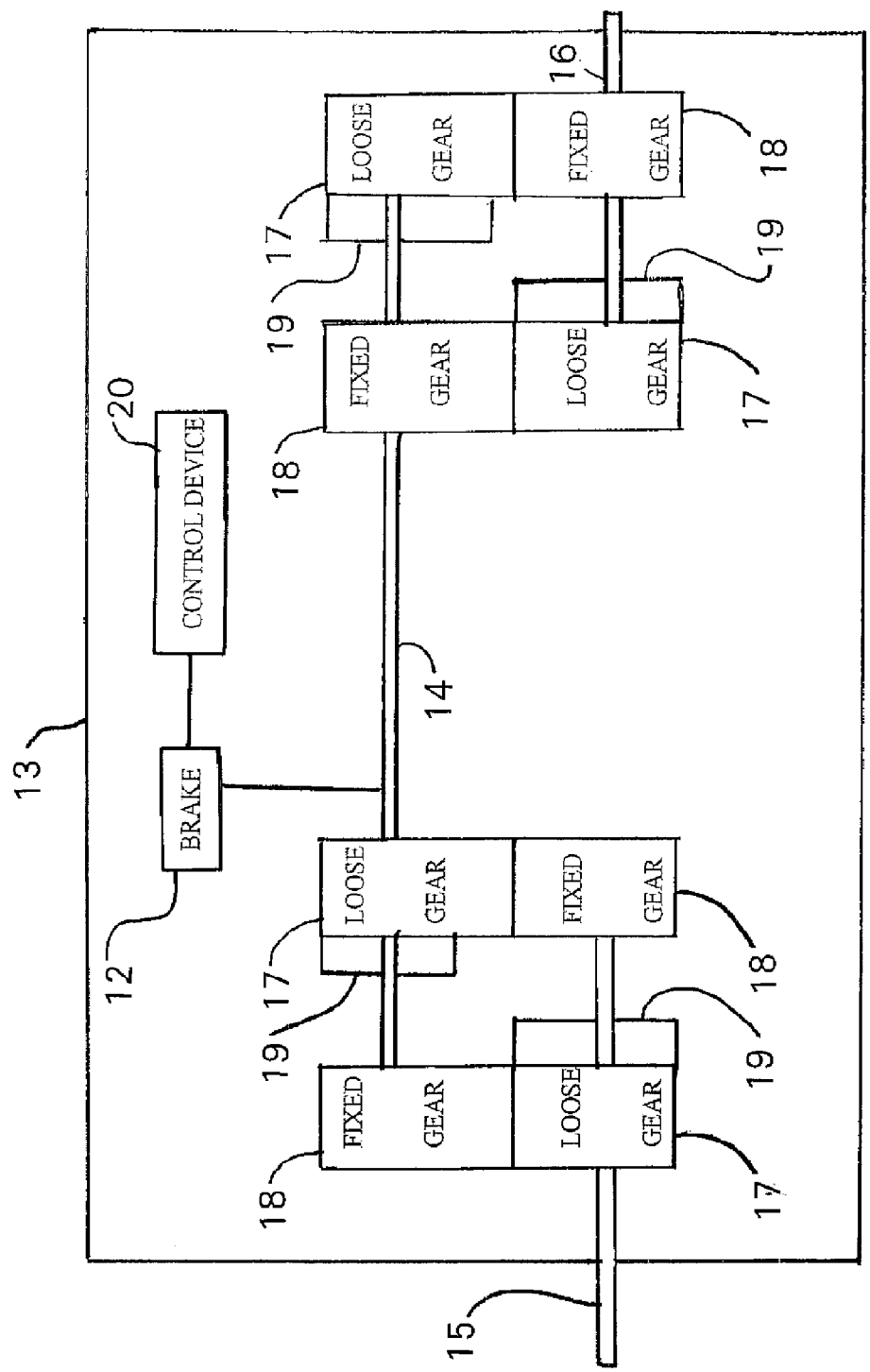
FIG. 3 shows the various components which are controlled and regulated by the method according to the present invention.

The various components, which are controlled and regulated by the method according to the present invention, are shown in FIG. 3. The automatic transmission 13 is constructed with a countershaft 14, having a transmission input shaft 15, with at least one countershaft 14 driven by the transmission input shaft 15 and with a transmission output shaft 16. Loose 17 and/or fixed gears 18 are supported upon the transmission input shaft 15, the countershaft 14 and/or on the transmission output shaft 16 which mesh with one another. A coupling apparatus 19 is provided for coupling the loose gears 17 and carrying out of a gear change. The transmission brake 12 is controlled by a control device 20 and is provided for braking the countershaft 14.

REFERENCE NUMERALS 1 transmission input speed of rotation
2 set transmission input speed of rotation
3 targeted speed of rotation window
4 synchronized run speed of rotation window
5 curve of the transmission input speed of rotation leads to no change of the lead time
6 curve of the transmission input speed of rotation leads to a lengthening of the lead time
7 curve of the transmission input speed of rotation leads to a lessening of the lead time
8 possible curve of the transmission input speed of rotation
9 mid-point of the targeted speed of rotation window
10 determination of the maximum rate of change of the transmission input speed of rotation
11 speed of rotation difference between the speed of rotation of the engagement procedure and the mid-point of the set speed of rotation window.
12 transmission brake
13 automatic transmission
14 countershaft
15 transmission input shaft
16 transmission output shaft
17 loose gear
18 fixed gear
19 coupling apparatus
20 control device

The invention claimed is:

1. A method for controlling and regulating a transmission brake of an automatic transmission constructed with a countershaft, and having a transmission input shaft, with at least one countershaft driven by the transmission input shaft, and with a transmission output shaft, the method comprising the steps of:

supporting at least one of rotatably loose gears and non-rotatable fixed gears, which at least stand in a pair forming mesh grip with one another, on at least one of the transmission input shaft, the countershaft and the transmission output shaft;

non-rotatably binding loose gears with a transmission shaft for carrying out a gear change by a coupling apparatus as well as with a transmission brake, with which the countershaft, controlled by a control device, can be braked upon an upshift procedure in such a way that a speed of rotation thereof corresponds to an engagement point in time of a synchronous speed of rotation or approaches this condition up to a predetermined tolerance;

considering a brake rate of change of the speed of rotation of the transmission input as well as a rate of change of speed of rotation of the transmission output shaft for determination of a disengagement point in time of the transmission brake; and disengaging the transmission brake, under consideration of a lead time, prior to the determined disengagement point in time.

2. The method according to claim 1, further comprising the step of determining the lead time for the transmission brake inserted into the automatic transmission at least one of once individually and adaptively at predetermined time periods, or is determined by repeated adaptive computations of the lead time at each upshifting procedure.

3. The method according to claim 1, further comprising the step of computing the lead time with consideration of a quality of a completed upshifting procedure, especially with consideration given to a synchronous run of rotating components of the transmission taking part in the shifting procedure.

4. The method according to claim 3, further comprising the step of evaluating the quality of the completed upshifting procedure with criterion of achieving a predetermined targeted speed of rotation window (3) by a transmission input speed of rotation (1) because of the brake engagement, the upper speed of rotation of the targeted speed of rotation window (3) lies under a set transmission input speed of rotation (2) following the upshift procedure.

5. The method according to claim 1, further comprising the steps of keeping a value for a lead time for future upshifting procedures constant, if the engagement procedure is carried out while a transmission input speed of rotation (5) lies within a targeted speed of rotation window (3), and computing a new lead time if the engagement procedure is established by a transmission input speed of rotation (6; 7) which lies outside of the targeted speed of rotation window (3).

6. The method according to claim 5, further comprising the step of extending the lead time for a next upshifting procedure for a predetermined time interval while the lead time is shortened for a predetermined time interval if the engagement procedure is carried out on the speed of rotation above the targeted speed of rotation window (3) under circumstances wherein the engagement procedure is carried out on the speed of rotation basis underneath the targeted speed of rotation window (3).

7. The method according to claim 5, further comprising the step of determining a maximum speed of rotational rate of change (10) of a transmission input speed of rotation (1) for the computation of a new lead time during a running upshifting procedure and the speed of rotation difference (11) between the transmission input speed of rotation (8) is determined during the engagement procedure and a mid-point (9) of the targeted speed of rotation window (3) and by division of the speed of rotation difference (11) is determined by the maximal speed of rotation rate of change (10) of an altering value for the next upshifting procedure and by applying of the altering value, a new lead time for another upshifting procedure can be computed.

* * * * *